though the specific aspects as described have some features of novelty, they do not constitute, as such, the present invention.

United States Patent Office
2,784,666
Patented Mar. 12, 1957

2,784,666
VOUCHER-ISSUING BUSINESS MACHINE

Albert Klaar and Heinz Puschmann, Bielefeld, Germany, assignors to Anker-Werke A. G., Bielefeld, Germany, a corporation of Germany Application July 8, 1954, Serial No. 442,126

Claims priority, application Germany August 1, 1953

11 Claims. (Cl. 101—69)

The present invention relates to voucher-issuing business machines such as cash registers.

It is often necessary to preserve records of expenses for accounting or tax purposes. For instance, when operating automotive vehicles, the receipts for gasoline, oil or repairs may have to be preserved by the driver. However, the customary vouchers or checks as dispensed by the conventional cash registers and given to the customers are not well suited for these purposes. Such checks are too short for being properly punched as would be necessary for collecting them in a file fastener or within one of the customary file wrappers. As a result, such records of receipts are easily lost, and fastening them together, say in bundles, is annoying and unduly time consuming.

It is, therefore, an object of our invention to provide a cash register or other business machine that eliminates such disadvantages and issues checks or other vouchers that are readily collectable in an orderly fashion. To this end and in accordance with one of the features of the invention, we provide a cash register or other voucher-printing business machine with a punching device that, as part of the operation of the machine, punches a pair of holes into the check or voucher tape being printed, and severs a check or voucher of such a length from the tape that it can be readily fastened, for instance, within a customary file fastener or wrapper.

It is another object of the invention to provide a cash register or other business machine that issues checks or vouchers which, aside from a stereotype imprint and an imprint referring to a single business transaction, have perforations suitably arranged for inserting the checks or vouchers in a file fastener.

It is still another object of the invention to provide a cash register or other business machine that issues checks or vouchers which, aside from a stereotype imprint and imprints referring to a plurality of business transactions and to a summary thereof, have perforations suitably arranged for inserting the checks or vouchers in a file fastener.

The novel features which we consider characteristic of our invention are set forth with particularity in the appended claims. The invention itself, however, and other objects and advantages thereof will be understood from the following description of a preferred embodiment when read in connection with the accompanying drawings in which:

Figure 1:
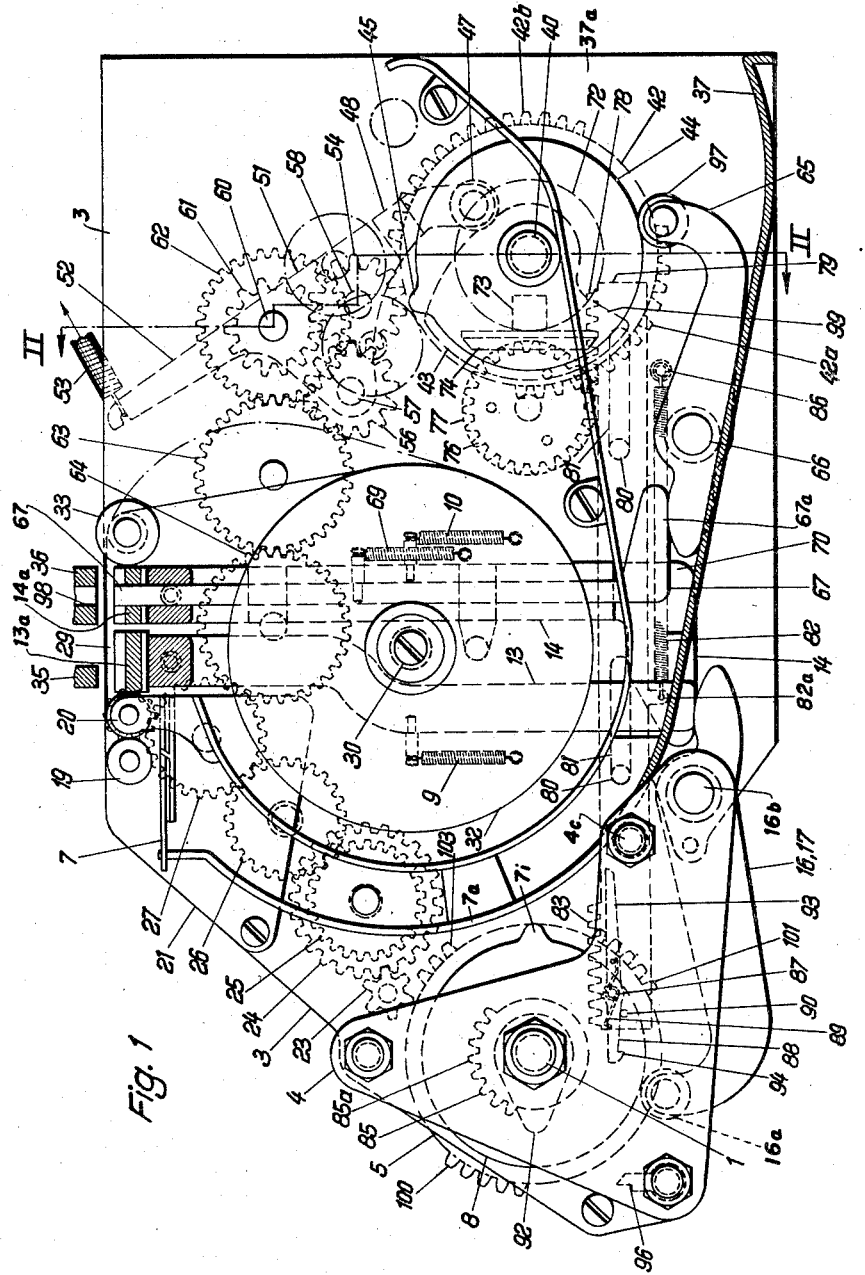
Fig. 1 is a side view of the check printing perforating and dispensing portion of a cash register according to this invention.
Figure 3:
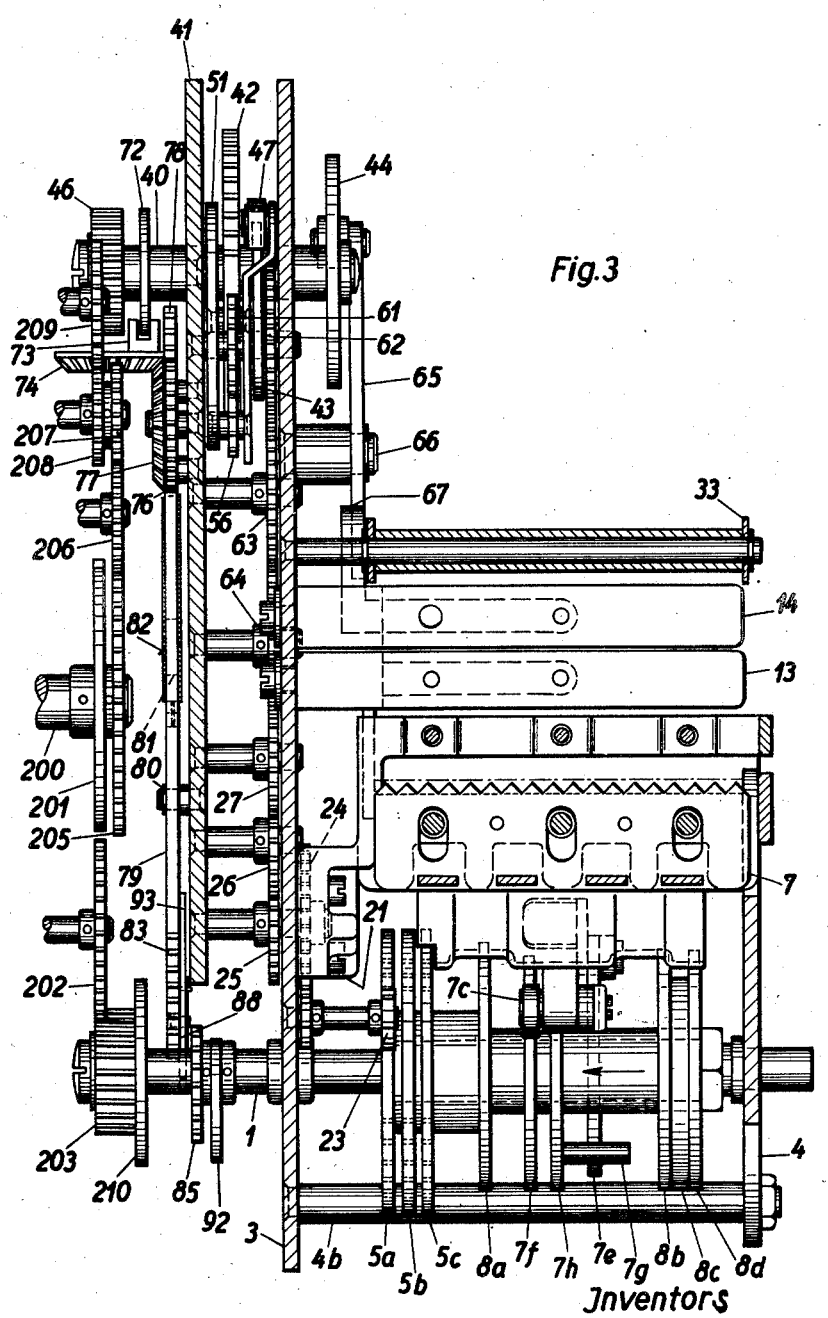
Fig. 3 is a top view of the hole-punching elements of the machine wherein parts have been left out in order to not impair the illustration.

Referring in more detail to the drawings, the illustrations shown in Figs. 1 and 3 include a control shaft 1, mounted between a side wall 3 and a plate 4 (Fig. 3). The shaft is rotatable and axially displaceable with respect to the wall 3 and the plate 4 and carries the control discs 7h, 7f for a cutting knife 7 fastened to a resilient support member 7a, as well as the control discs 5a, 5b, 5c of a check tape feeding mechanism. Also mounted on the shaft 1 are the control discs 8a, 8b, 8c, 8d for two printing hammers 13, 14 which are governed by the tension springs 9 and 10, respectively, and are actuated by two printing levers 16 and 17. The control shaft 1 is driven from the main drive shaft 200 of the machine by means of a gear train 201, 202, 203. Since one-half of the circumference of the gear wheel 201 is devoid of teeth, the control shaft 1 remains at a standstill while the main drive shaft rotates from 0° to 180°, but performs a full clockwise rotation when the main drive shaft is turning from 180° to 360°. A necessary transversal shifting of the control shaft 1 is accomplished by means of a shift lever arrangement (not shown) which is connected to the pre-selector keys of the machine and actuates a shifting disc 210 on the control shaft 1.

Figure 4:
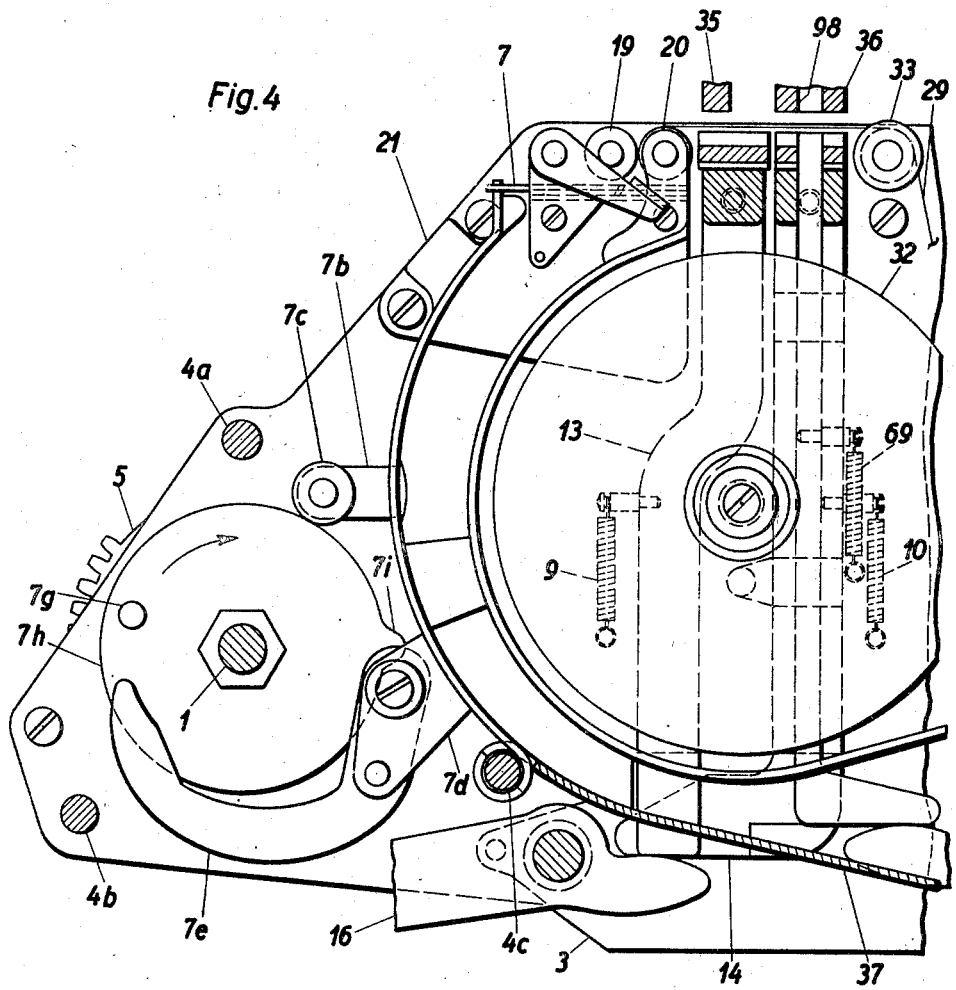
Fig. 4 is a side view of the hole-punching elements and the check cutting device of the machine.

The resilient support member 7a of the knife 7 is mounted to swing about the bar 4c and is actuated by the discs 7f or 7h, in response to a roll 7c, that, mounted rotatably on a bracket 7b, follows the contours of the control discs 7f, 7h. If one of the peripheral bosses 7i of these control discs enters into action, the resilient support member 7a swings in a clockwise direction and the knife 7 is put into a cutting motion. Return of the knife into rest position is caused by a cross pin 7g fastened to the control disc 7h. When passing a reversing lever 7e mounted to a bracket 7d of the resilient support member 7a, the cross pin 7g causes a counterclockwise movement of the reversing lever 7e (Fig. 4) and, thereby, a return of the resilient support member and the knife 7 into the rest position, as shown.

Two feed rollers 19, 20 are rotatably journalled between the side wall 3 and a lateral plate 21 (Fig. 4) that is firmly secured to wall 3 in parallel and spaced relation thereto. The feed rollers 19 and 20 are driven from the control gears 5 on control shaft 1 through a train of spur gears 23, 24, 25, 26 and 27. A check-tape supply reel 32, turning about a shaft 30, supplies a tape 29 which passes over a guide roller 33 to between the two feed rollers 19 and 20 so that an amount of tape is fed downwardly from between the feed rollers 19 and 20 when these rollers are driven. The tape 29 passes between guide roller 33 and feed roller 20 along the backing plate or platen 13a of the printing hammer 13 and the backing plate 14a of the printing hammer 14. Arranged above the backing plate 13a and at the opposite side of the tape 29 are the printing types 35 which, in the course of operation, selectively impress the registered amounts and other data upon the tape. Located opposite to the backing plate 14a is a cliché 36 for making a stereotype imprint such as a firm name, etc. upon the tape. The check portion, after being imprinted and moved downward between the rollers 19, 20, is severed from the tape by the cutting blade 7 and then passes into a chute 37 (Figs. 1, 2) in which it slides toward a dispensing opening 37a (Fig. 1) of the cash register.

As far as described, the components of the check printing and issuing devices and their operation are known and for that reason will be described in further detail only in conjunction with the punching device.

Another control shaft 40 (Figs. 1, 2) is rotatably mounted between the side wall 3 and an intermediate wall 41 (Fig. 2) and is likewise displaceable along its axis. A spur gear 42, a cam disc 43 and a control disc 44 are rigidly secured to control shaft 40. By means of a gear train 205, 206, 207, 208 and 209, and a spur gear 46 (Fig. 3) attached thereto, the shaft 40 is driven from the main drive shaft 200 of the machine. Since the pinion 205 which is keyed to the main drive shaft 200, is toothed along only 180° of its circumference, the shaft 40 is rotated intermittently in a clockwise direction, namely when the main drive shaft turns from 0° to 180°.

Figure 2:
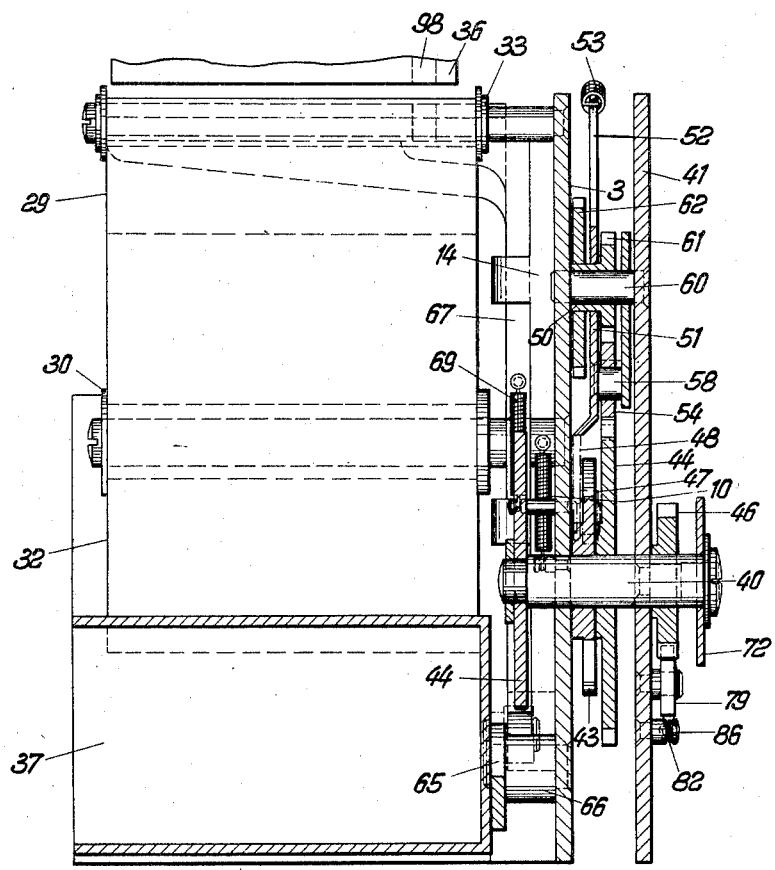
Fig. 2 is a sectional view taken on the line II—II in Fig. 1.

The cam disc 43 (Fig. 1) cooperates with a cam follower 47 journalled on a lever arm 48 that forms part of a mounting frame 51 which is pivotally movable about a shaft 60 (Figs. 1, 2). A tension spring 53 attached to an arm 52 of the frame structure 51 biases this structure clockwise about shaft 60, thus holding the cam follower 47 against the cam disc 43. Depending upon the angular position of the frame 51, the gear 42 of shaft 40 meshes either with a gear 54 or with a gear 56 journalled to the reversing-gear frame 51 by means of shafts 57 and 58 respectively. A spur gear 61 (Figs. 1, 2) keyed to the shaft 60 has a hub or sleeve portion 50 (Fig. 2) whereby it is rigidly joined with a coaxial drive gear 62. By means of a train of gears 63, 64 journalled to the side wall 3, and including the gear 27, the drive gear 62 (Fig. 1) actuates the feed rollers 19, 20.

The control disc 44 (Figs. 1, 2) cooperates moreover with a punch lever 65 pivoted about a shaft 66 which is mounted on the side wall 3. The lever 65 acts upon the foot portion 67a of a punching pin 67 which is movably mounted within a boring of the printing hammer 14 and is biased by a tension spring 69 (Fig. 1) to normally maintain the illustrated position in which the foot 67a of the punching pin rests against a projection 70 (Fig. 1) of the printing hammer 14.

Figure 5:
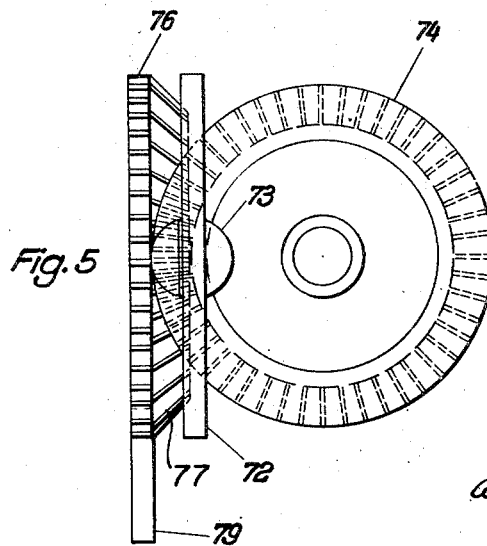
Fig. 5 shows a detail of the machine as illustrated in Figs. 1 and 2.

The control shaft 40 carries, furthermore, a disc 72 (Figs. 1, 2, 5) which engages a slotted pin 73. Pin 73 is rotatably mounted on a bevel gear 74 near the periphery of that gear. When gear 74 is being driven, the control shaft 40 is moved back and forth by means of the pin 73 and the disc 72. A bevel gear 77 firmly joined with a spur gear 76 meshes with the bevel gear 74 for driving the latter. The spur gear 76 meshes with a first-gear portion 78 of a rack 79 (Figs. 1, 2, 5). The rack 79 is displaceably fastened along the intermediate wall 41 (Fig. 2), by means of a pin-and-slot engagement 80, 81. A spring 82 attached between an eye 82a and a pin 86 biases the rack 79 toward the illustrated position. The rack 79 has another gear portion 83 for cooperation with a gear 85 that is mounted on the control shaft 1 and has a series of gear teeth extending over only part of its periphery.

By means of a pin 87 a hook catch 88 is pivotally fastened to the rack 79 of a pivot pin 87 and is biased by a spring 89 in a counterclockwise direction so that the hook catch normally abuts against a stop pin 90 firmly secured to rack 79. A boss 92 secured to the control shaft 1 is adapted to engage an arm 93 of the hook catch 88 to move it in a clockwise direction while the boss 92 is passing through a given angle of rotation. In addition, by means of a hook 94 the hook catch and the entire rack 79 can be arrested by a detent 96.

The operation of the apparatus is as follows.

When the buisness transaction to be registered involves only the sale of one single item, the operator of the cash register, after setting up the amount to be registered, depresses a "single item" key which sets the machine in operation. The main shaft of the machine, when passing through the first 180° of its revolution, causes the control shaft 40 to rotate through 360°. As a result, the cam disc 43 lifts the arm 48 and thereby turns the reversing-gear frame 51 counterclockwise about the shaft 60 (Fig. 1). This causes the gear 56 to enter into meshing engagement with the first row of teeth 42a of the gear 42. The gear 56 is partly turned and this movement is transmitted by the gear train 54, 61, 62, 63, 64 and 27 to the feed rollers 19, 20, causing the latter to unwind a given amount of tape 29 from the supply reel 32.

Figure 7:
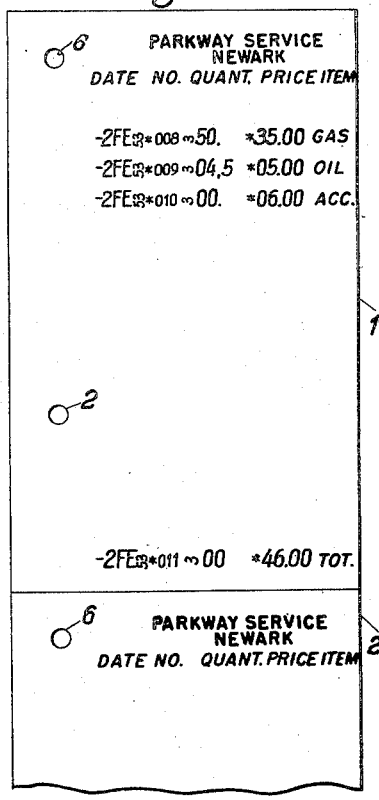
Fig. 7 shows a multiple-item check with a totalized amount.
Figure 6:
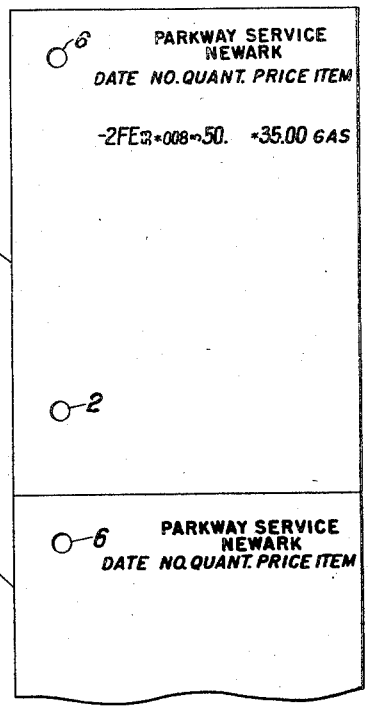
Fig. 6 shows a single-item check as it may be issued by the machine.

After the last tooth of the gear portion 42a has passed beyond the spur gear 56, the gear 56 and hence the check tape 29 stop moving. By means of its peripheral boss 45, the control disc 44 imparts now through the roller 97 a short, clockwise movement to the punch lever 65 about the shaft 66. This causes the punching pin 67 to be flung upward in opposition to the spring 69. The top end of punching pin 67 forces the check tape 29 against the body of the cliché 36 and puches a hole 2 into the tape by entering a boring 98 in the cliché body (Figs. 6, 7).

As soon as the boss 45 has passed the punch lever 65, the spring 69 pulls the punching pin 67 and therewith also the punch lever 65 back into the illustrated normal position. In the meantime, the cam disc 43 has turned far enough for the roller 47 of arm 48 to follow the cam jump 99 (Fig. 1). Consequently, the roller 47, under the pull of spring 53, drops toward the shaft 40. This turns the reversing-gear frame 51 back into the illustrated position, and the gear portion 42b of gear 42 now enters into meshing engagement with the spur gear 54. As a result, the feed rollers 19, 20 are now driven in the opposite direction so that the punched tape 29 is moved back into the initial position.

As described above, when the machine operation is initiated by actuation of the single-item key (during this operation the control shaft 1 remains in the position illustrated in Fig. 3), then during the first 180 degrees of rotation of the machine main shaft the control shaft 40 is effective to feed the check tape a certain amount, the check tape is thereupon punched and is thereafter moved back to its starting position. The drive next changes over to operation of the control shaft 1. Consequently, the control members 5a, 8a, 7f, 7g and 8b, assigned to single-item transactions, become effective in sequence. During the above-described operation of the machine, the values put into the machine are scanned and are transferred into the usual adding or printing mechanism (not illustrated). That is, the check tape at first receives an impression of the amount put into the printing mechanism 35, this impression being produced by the printing hammer 13 under control by the control disk 8a. In the meantime, the row of teeth 100 of control disk 5a has entered into engagement with the spur gear 23. The row of teeth 100, acting through spur gears 24 to 27 and feed rollers 19 and 20, causes the check tape to be set into the position for the printing of the cliché. The control disk 8b now becomes effective. It causes the printing hammer 14 and the punching pin 67 connected with the hammer to provide the check tape with the impression of the cliché and also with a punch hole.

In the meantime, the second row of teeth 101 of the control disk 5a has entered into meshing engagement and effects feeding of the check tape 29 into the cut-off position. The knife 7 is now controlled by control disk 7f through roller 7c and cuts through the check tape. During further rotation of the control shaft 1 the knife 7 is returned to its inactive position by the operation of the control disks 7g, 7e. However, the above-mentioned cliché impression and punch hole remain on the check tape; that is, they are not severed from the tape and serve as a heading for the check next to be issued.

The control shaft has now terminated its movement. The main machine drive is likewise arrested, and the machine is available for another machine operation.

However, when the machine operation is released by the actuation of the multiple-item key, then the control shaft is moved simultaneosuly with the actuation of the key by one division in the direction of the arrow shown in Fig. 3. As a result, the spur gear 23 is now controlled by the control disk 5b, the printing hammer 13 is still under control by the control disk 8a, while the knife 7 and the cliché printing hammer 14 are not acted upon by the control disks on control shaft 1. If now, after the control shaft 40 has operated to cause the check tape 29 to be fed, punched and returned to its initial position, the control shaft 1 is driven, then the first occurring operation is the production of an impression of the amount entered into the printing mechanism 35. This impression is made by the printing hammer 13 controlled by the control disk 8a. The row of teeth 103 of control disk 5b now enters into meshing engagement with spur gear 23 and feeds the check tape a distance equal to one line spacing. Simultaneously, the spur gear 85 which is likewise secured to the control shaft 1, moves the rack 79 toward the left in opposition to the force of spring 82, and the rack is then arrested by means of the latching pawl 88. This places the control shaft 40 out of action as described above. The machine operation is thus terminated. When another amount is entered into the machine and the machine is set in operation, then the rotation of control shaft 40 has no effect upon the check tape 29, and the revolution of the control shaft 1 produces only the impression of the amount entered into the printing mechanism and a subsequent feeding movement of the check tape by one line spacing.

If now the total key is being pressed, then the control shaft 1 is axially displaced another step in the direction of the arrow shown in Fig. 3. As a result, the boss 92 can now cooperate with the latch pawl 88. The control disk 5c with its two partial rows of teeth 100 and 101 can cooperate with the spur gear 23. The control disk 7h can coact with a knife 7 through the driving roller 7c. The control disk 7g is in active relation to the nose 7e for placing the knife 7 into the inactive position. The control disk 8d is placed in active relation to the cliché printing hammer 13, while the control disk 8a is still actively engageable with the printing hammer 13. During the machine operation now occurring, the control shaft 40 is still ineffective, while during the rotation of the control shaft 1 the entered total amount is printed upon the check tape, the check tape is fed by means of the row of teeth 100 into the cliché printing position, the cliché is impressed upon the tape and the tape is simultaneously punched, the row of teeth 101 of control disk 5c advances the tape into the cutting position, and the printed check is severed off the tape by means of the control disks 7h, 7g. For greater detail with reference to the constructional and operational features of the strip feeding and severing mechanism reference can be had to U. S. Patent No. 2,698,660, issued January 4, 1955 and entitled "Combined Tape Feeding, Severing and Delivering Mechanism."

Before the rotation of control shaft 1 is terminated, the boss 92 causes the control shaft 40 to be again placed into active condition. The machine operation is thus terminated and the machine is ready for further transactions.

It will be obvious to those skilled in the art upon a study of this disclosure that our invention permits of various modifications especially as regards the design and arrangement of its individual components, and hence may be embodied in cash registers or other voucher-issuing machines other than the one specifically illustrated and described without departing from the essence of our invention and within the scope of the claims annexed hereto.

We claim:

1. A record-punching device for cash registers and other business machinery, the said device comprising, in combination with a tape reel, tape advancing means, tape printing means including at least one reciprocally acting printing hammer and a tape cutter including an angularly reciprocable element forming a continuously curved guide structure adapted to be slidingly engaged by the severed record; a reciprocally acting punching pin arranged adjacent to said printing hammer to perforate said tape near one edge, a main drive including a main drive shaft, a first control drive shaft, gear means causing a full revolution of the said first control drive shaft during a first one-half revolution of the main drive shaft, a spring-biased reversing gear train mounted between said first control drive shaft and said tape advancing means adapted to unwind a length of tape from said reel during part of the rotation of said first control drive shaft, a disc having a peripheral boss keyed to said first control drive shaft, a pivotally mounted punch lever arranged between the disc keyed to said first control drive shaft and the foot of said punching pin, said disc being angularly adjusted to actuate said punch lever after said length of tape has been unwound, a cam disc keyed to said first control drive shaft designated to shift said reversing gear train into position for rewinding said length of tape, a second control drive shaft, gear means causing a full revolution of said second control drive shaft during a second one-half revolution of said main drive shaft, a disc having a peripheral boss keyed to said second control drive shaft, a pivotally mounted printing lever between the disc keyed to said second control drive shaft and said printing hammer, a projection extending from said printing hammer to underneath the foot of said punching pin, actuating said punching pin in synchronism with the movement of said printing hammer into punching a second hole, and a gear train between said second control drive shaft and said tape advancing means, adapted to move the said tape into cutting position.

2. A record-punching device for cash registers and other business machinery issuing records provided with a stereotype imprint and a variable imprint, said device comprising, in combination with a tape reel, tape advancing means, tape printing means including a reciprocally acting printing hammer for the variable imprint, a reciprocally acting printing hammer for the stereotype imprint and a tape cutter including an angularly reciprocable element forming a continuously curved guide structure adapted to be slidingly engaged by the severed record; a reciprocally acting punching pin arranged adjacent to said printing hammer for the stereotype imprint to perforate said tape near one edge, a main drive including a main drive shaft, a first control drive shaft, gear means causing a full revolution of said first control drive shaft during a first one-half revolution of the main drive shaft, a spring-biased reversing gear train mounted between said first control drive shaft and said tape advancing means adapted to unwind a length of tape from said reel during part of the rotation of said first control drive shaft, a disc having a peripheral boss keyed to said first control drive shaft, a pivotally mounted punch lever arranged between the disc keyed to said first control drive shaft and the foot of said punching pin, said disc being angularly adjusted to actuate said punch lever after said length of tape has been unwound, a cam disc keyed to said first control drive shaft designed to shift said reversing gear train into position for rewinding said length of tape after punching, a second control drive shaft, gear means causing a full revolution of said second control drive shaft during a second one-half revolution of said main drive shaft, a disc having a peripheral boss keyed to said second control drive shaft, a pivotally mounted printing lever between the disc keyed to said second control drive shaft and said printing hammers, a projection extending from said printing hammer for the stereotype imprint to underneath the foot of said punching pin, actuating said punching pin in synchronism with the movement of said printing hammer into punching a second hole, and a gear train between said second control drive and said tape advancing means, adapted to move said tape into cutting position.

3. A record-punching device according to claim 2, adapted for cash registers and other business machinery issuing records with a variable imprint including a plurality of business transactions and a summary of the business transactions, said device comprising transversely displaceable first and second control gear shafts, a mitre gear arrangement for transversely displacing said first control gear shaft out of meshing contact with said reversing gear train, hand operated means for transversely displacing said second control gear shaft, a partially toothed gear mounted on said second control gear shaft, a spring-biased rack arranged between said control gear shafts in meshing contact at one end with said mitre gear arrangement and adapted for engagement at the other end by said partially toothed gear upon rotation of said second control gear shaft in a displaced position, means for arresting said rack after engagement by said partially toothed gear, means including a second printing lever and gears fastened on said second control gear shaft for actuating, upon transversal displacement of said second control gear shaft, the said tape advancing means and said printing levers and punching pin, and a boss fastened to said second control gear shaft for releasing said rack.

4. A cash register, comprising tape accommodating means, voucher-issuing means, tape feed means defining a travel path between said accommodating means and said voucher-issuing means, a voucher printing device disposed along said path, a cutter disposed along said path between said printing device and said issuing means for severing a printed voucher off the tape, a punching device located ahead of said cutter in the tape feed direction, a drive shaft, control mechanism in driven relation to said shaft and having sequential transmission means connected with said feed means and printing device and cutter for sequentially feeding, imprinting and severing a voucher, said mechanism having transmission means connected with said punching device and having, relative to the feeding travel of the tape, two points of punching operation of a fixed spacing from each other along the tape and located along one edge of the tape, whereby the cash register issues printed vouchers perforated for attachment to a file fastener.

5. In a cash register according to claim 4, said tape feed means comprising a feed roller engageable with the tape, and said transmission means having a reversible gearing in driving connection with said feed roller and having control means responsive to unidirectional revolution of said drive shaft and connected with said gearing whereby said gearing causes said feed roller during revolution of said shaft to first advance the tape to a first punching position and then retract the tape to printing position and thereafter advance the tape to a second punching position, said punching device having a single punch pin normally in inactive position and movable to active punching position when the tape is in said first and in said second advanced positions.

6. In a cash register according to claim 5, said control means comprising a control shaft and a cam mounted on said control shaft, said reversing gearing having a motion-reversing gear shift member in operative connection with said cam.

7. In a cash register according to claim 4, said printing device comprising a cliché printing portion movable toward and away from said path of the tape, and said punching device having a punch pin structure normally in inactive position and capable of movement across said path to perforate the tape, and said cliché printing portion having entrainer means engageable with said pin structure during said movement, whereby said pin structure is entrained to perforate the tape together with movement of said cliché printing portion caused by said transmission means.

8. In a cash register according to claim 7, said punching pin structure being movable independently of said cliché printing portion, and said control mechanism having respective transmission means phase displaced against each other and engageable with said pin structure and said cliché printing portion respectively, whereby said pin structure is operated twice at respectively different moments namely independently and together with said portion respectively.

9. A machine for issuing printed transaction vouchers having a pair of spaced perforations, comprising paper strip feed means, means for printing a cliché on the paper strip, means for printing transactions on the paper strip, mechanism for perforating the paper strip, drive means, and an axially shiftable control shaft movable from a first to a second position; said control shaft, drive means, paper strip feed means, cliché printing means and transaction printing means being cooperative when said control shaft is in said first position to sequentially advance the strip by a given amount, perforate said strip while in said advanced position, withdraw said strip by a given amount less than the amount first advanced to a position for printing a transaction, print said transaction, advance said strip to a position beyond the amount first advanced, imprint said cliché on said strip while simultaneously perforating said strip; and when said control shaft is in said second position being cooperative to sequentially advance the strip by a given amount, perforate said strip while in said advanced position, withdraw said strip by a given amount less than the amount first advanced to a position for printing a transaction, print said transaction, advance said tape one space for another imprint, and cyclically repeat said space advancement upon successive transaction imprints.

10. A machine for issuing printed transaction vouchers having a pair of spaced perforations, comprising paper strip feed means, means for printing a cliché on the paper strip, means for printing transactions on the paper strip, mechanism for perforating the paper strip, paper strip cut-off means, drive means, and an axially shiftable control shaft movable from a first to a second position; said control shaft, drive means, paper strip feed means, cliché printing means, transaction printing means and paper strip cut-off means being cooperative when said control shaft is in said first position to sequentially advance the strip by a given amount, perforate said strip while in said advanced position, withdraw said strip by a given amount less than the amount first advanced to a position for printing a transaction, printing said transaction, advancing said strip to a position beyond the amount first advanced, imprint said cliché on said strip while simultaneously perforating said strip, and finally cut off said paper strip at a position forward of said printed cliché; and when said control shaft is in said second position being cooperative to sequentially advance the strip by a given amount, perforate said strip while in said advanced position, withdraw said strip by a given amount less than the amount first advanced to a position for printing a transaction, print said transaction, advance said tape one space for another imprint, and cyclically repeat said space advancement upon successive transaction imprints.

11. A machine for issuing printed transaction vouchers having a pair of spaced perforations, comprising paper strip feed means, means for printing a cliché on the paper strip, means for printing transactions on the paper strip, means for printing a total of transactions printed, mechanism for perforating the paper strip, paper strip cut-off means, drive means, and an axially shiftable control shaft movable from a first to a second and to a third position; said control shaft drive means, paper strip feed means, cliché printing means, transaction printing means and paper strip cut-off means being cooperative when said control shaft is in said first position to sequentially advance the strip by a given amount, perforate said strip while in said advanced position, withdraw said strip by a given amount less than the amount first advanced to a position for printing a transaction, print said transaction, advance said strip to a position beyond the amount first advanced, imprint said cliché on said strip while simultaneously perforating said strip, and finally cut off said paper strip at a position forward of said printed cliché; when said control shaft is in said second position being cooperative to sequentially advance the strip by a given amount, perforate said strip while in said advanced position, withdraw said strip by a given amount less than the amount first advanced to a position for printing a transaction, print said transaction, advance said tape one space for another imprint, and cyclically repeat said space advancement upon successive imprints; and upon moving said shaft from said second to said third position being cooperative to terminate said cyclical repetition, advance said strip by a given amount more than the amount first advanced to a position for printing a total, print said total, advance said strip to a second advanced position, imprint said cliché on said strip while simultaneously perforating said strip, and finally cut off said paper strip at a position forward of said printed cliché.

References Cited in the file of this patent

UNITED STATES PATENTS

| | | |
|---|---|---|
| 2,002,437 | Maul | May 21, 1935 |
| 2,050,745 | Woodruff | Aug. 11, 1936 |
| 2,076,705 | Carroll | Apr. 13, 1937 |
| 2,081,836 | Racz | May 25, 1937 |
| 2,238,517 | Colley | Apr. 15, 1941 |
| 2,339,321 | Crosman | Jan. 18, 1944 |
| 2,444,564 | Goodbar | July 6, 1948 |
| 2,521,435 | Wockenfuss | Sept. 5, 1950 |
| 2,655,098 | Dutro | Oct. 13, 1953 |
| 2,682,833 | Gardinor | July 6, 1954 |